(12) United States Patent
Bethe

(10) Patent No.: US 8,460,774 B2
(45) Date of Patent: Jun. 11, 2013

(54) SPLICE TAPE FOR IMPRINTABLE WEBS

(75) Inventor: James Clifford Bethe, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 12/830,075

(22) Filed: Jul. 2, 2010

(65) Prior Publication Data

US 2012/0003405 A1   Jan. 5, 2012

(51) Int. Cl.
*B31F 5/06* (2006.01)
*B32B 3/02* (2006.01)

(52) U.S. Cl.
USPC ............... 428/53; 428/56; 428/58; 428/216; 428/354; 428/411.1; 428/488.11; 428/511; 156/157; 156/304.1; 156/304.3

(58) Field of Classification Search
USPC ............ 428/195.1, 40.1, 40.3, 41.8, 53, 56, 428/58, 216, 354, 411.1, 488.11, 511; 156/157, 156/304.1, 304.3
See application file for complete search history.

(56) References Cited

U.S. PATENT DOCUMENTS

| | | | | |
|---|---|---|---|---|
| 3,135,642 A | * | 6/1964 | Ruffer | 428/61 |
| 3,573,146 A | * | 3/1971 | Guinan et al. | 428/61 |
| 3,616,109 A | | 10/1971 | Miro et al. | |
| 4,004,058 A | * | 1/1977 | Buros et al. | 428/215 |
| 4,201,808 A | * | 5/1980 | Cully et al. | 428/40.7 |
| 4,257,837 A | * | 3/1981 | Lucas | 156/153 |
| 4,398,985 A | * | 8/1983 | Eagon | 156/233 |
| 5,039,374 A | | 8/1991 | Winter | |
| 5,152,858 A | | 10/1992 | Winter | |
| 5,154,956 A | * | 10/1992 | Fradrich | 428/40.6 |
| 5,320,698 A | | 6/1994 | Fournier et al. | |
| 5,348,793 A | | 9/1994 | Stettner | |
| 5,472,755 A | | 12/1995 | Nibling, Jr. | |
| 5,587,214 A | | 12/1996 | Mitchell, Jr. | |
| 5,783,010 A | * | 7/1998 | Fisher et al. | 156/159 |
| 5,996,927 A | | 12/1999 | Weirauch et al. | |
| 6,033,751 A | | 3/2000 | Kline | |
| 6,150,035 A | * | 11/2000 | DeFife et al. | 428/500 |
| 6,165,576 A | * | 12/2000 | Freedman et al. | 428/36.91 |
| 6,224,831 B1 | * | 5/2001 | Stafford et al. | 422/421 |
| 6,432,241 B1 | | 8/2002 | Congard et al. | |
| 6,488,228 B2 | | 12/2002 | Davies et al. | |
| 6,627,024 B2 | | 9/2003 | Lane | |
| RE38,356 E | | 12/2003 | Weirauch et al. | |
| 6,756,101 B2 | | 6/2004 | Manteufel et al. | |
| 6,761,969 B2 | * | 7/2004 | Li et al. | 428/354 |

(Continued)

FOREIGN PATENT DOCUMENTS

EP    0860489 A2    8/1998

*Primary Examiner* — Cathy Lam
(74) *Attorney, Agent, or Firm* — Muncy, Geissler, Olds & Lowe, PLLC

(57) ABSTRACT

A splice tape for a thermally imaging web. A polymer tape layer, which is thin and strong, has an adhesive layer on its lower side and a thermally imaging composition on its upper side. The thermally imaging composition is similar to the thermal imaging layer on the web. When two ends of a web are joined, the splice tape is placed thereon to join the two ends. The splice tape may be printed at the same time as the web. The thinness of the splice allows the printing to be consistent at the splice, minimizing blank areas.

17 Claims, 2 Drawing Sheets

U.S. PATENT DOCUMENTS

| | | |
|---|---|---|
| 6,797,333 B2 | 9/2004 | Haase et al. |
| 6,899,933 B2 | 5/2005 | Bean et al. |
| 6,951,676 B2 | 10/2005 | Shaw |
| 7,037,397 B2 | 5/2006 | Bean et al. |
| 7,087,278 B2 | 8/2006 | Elkmeier et al. |
| 7,279,209 B2 | 10/2007 | Masuda et al. |
| 7,306,844 B2 * | 12/2007 | Chu et al. .................. 428/350 |
| 7,399,509 B2 * | 7/2008 | Virtanen .................. 428/40.1 |
| 7,476,429 B2 | 1/2009 | Bean et al. |
| 2008/0087370 A1 | 4/2008 | Manteufel |

* cited by examiner

SPLICE TAPE FOR IMPRINTABLE WEBS

BACKGROUND OF THE INVENTION

1. Field of the Invention

The present invention is directed generally to a splice tape to splice together two ends of a web and more specifically to a splice tape that is imprintable and splices together two ends of imprintable webs.

2. Discussion of the Background

Various kinds of coated papers are known for use in preparing printed products. That is, a basic paper base is coated with a composition that is affected by heat, pressure or other stimuli to form writing or codes on the paper. This can be a carbonless system which is written on with a ballpoint pen or a bar code system where the bars are printed thermally, or other similar systems.

When using a printer for printing labels and other products, it is common to use a roll of coated paper for the paper supply. One end is inserted into a printer, which operates repeatedly to print the desired pattern on the web. A print head operates on the coated paper to cause the markings to appear. For example, the print head may contain a series of heat producing elements in a row or array which are selectively actuated to print a selected bar code or other indicia. Such a printer may be flat, with the coated paper being moved over its surface. Some systems could also use a rotary printer.

The roll of coated paper or web that is used in the printing process is usually manufactured elsewhere and placed on rolls. A common problem is that defects may occur in the web. If the defect is left in place, the printed product will be defective and have to be thrown away. The defect can be removed, but the two ends must be spliced together, or the roll will be shortened. Likewise, if the web is shorter than a full roll, it must be spliced to another piece or be thrown away.

Unfortunately, the presence of the splice can cause problems of its own. If the splice does not hold when the web is pulled through the printer, the web may break and become entangled in the printer. Since the splice may be made of different material than the web or may be uncoated, the printing on the splice may appear different than on the rest of the web and may need to be thrown away.

U.S. Pat. No. 7,279,209 to Masuda shows one prior art attempt to solve these problems. Thermally imprintable labels 12 include a face layer 14, adhesive 22 and liner 20 to form a web. A splice is formed between two webs by adhering a third imprintable paper with adhesive over the gap between the first and second webs. An additional splice tape is also applied to the backside of the gap. Thus, the splice includes two splice tape layers 52 and 60, plus adhesive and the liner 20 in addition to the label itself. However, this arrangement almost doubles the thickness of the original web, making a lump or lopsided portion which may cause it to get caught in the printer or to not move smoothly. In addition, even if the third paper is imprintable, the thickness of the splice causes the printing roller to lift off the web, leaving an unprinted area, which may ruin the product in that area.

SUMMARY OF THE INVENTION

Accordingly, the present invention provides a splice tape which is imprintable and thin.

The present invention also provides a splice tape that forms a strong bond with the underlying webs.

The present invention also provides a splice tape which is thin and forms a strong bond with the underlying webs and is imprintable.

The present invention further provides a splice formed by a splice tape overlying the ends of two webs.

The present invention further provides a splice tape which is thin and strong and allows printing without forming an unprinted area.

The present invention further provides a splice tape which is thin, strong and printable.

The present invention is achieved by providing a thin, strong polymer tape to which adhesive is applied on one side and a printable composition on the other side. The splice tape is adhered to the ends of two webs which are butt jointed to form a splice which is not much thicker than the original web and which is printable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
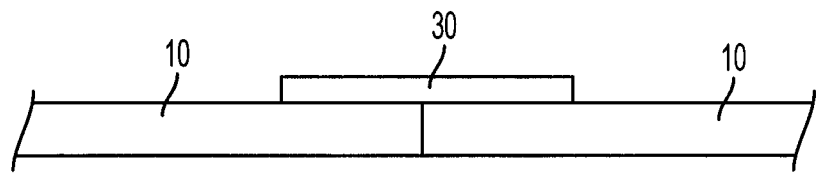
FIG. 1 is a diagram showing a splice between two webs.

Referring now to the drawings, wherein like numerals designate identical or corresponding parts throughout the several views, and more particularly to FIG. 1, thereof, wherein two webs 10 are shown as being arranged end to end in a butt joint. The joint is covered by a splice tape 30. The thickness of the webs and tape are not shown to scale, and the thickness of the tape is considerably less than the thickness of the web. The tape is made from a thin, but strong polymer material. Because the polymer material is strong, it is possible to use a thinner tape. It is also not necessary to provide a backing tape on the other side of the webs. The thin tape is less likely to interfere with the printer. Further, the strength of the polymer material prevents the splice tape from splitting or coming loose from the joint. The joint is shown as extending perpendicular to the length of the webs, but could also be at an angle, with the splice tape also being applied at an angle.

Figure 2:
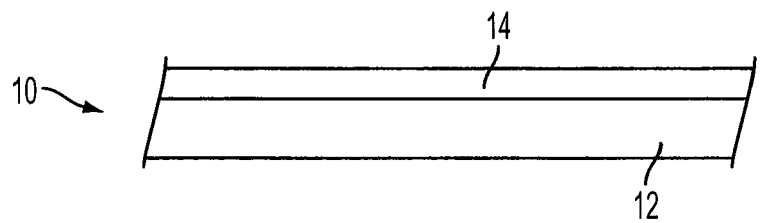
FIG. 2 is a diagram showing the layers of a web.

FIG. 2 shows a cross-section of the web 10. Layer 12 is a paper material that provides the structure for the web. Layer 14 is a coating which permits imprinting of markings. For example, this can be a composition which is thermally printable. This could also be a composition for carbonless printing with a ball point pen and could be layered on either the front or back of the paper layer 12. Any of many such known imprintable compositions can be used.

Figure 3:
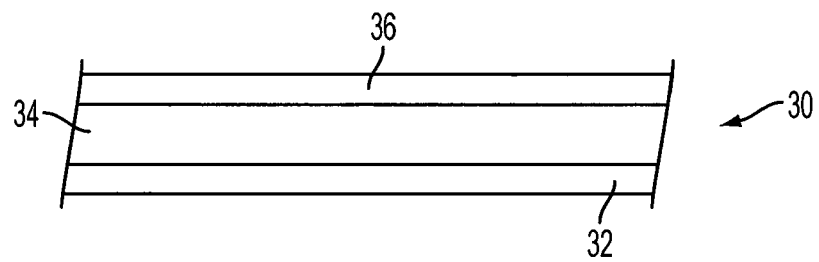
FIG. 3 is a diagram showing the layers of a splice tape.

FIG. 3 shows a cross-section of the splice tape 30. The central layer 34 is a polymer tape made, for example, of polyester material. It should be as thin as possible while retaining enough strength to prevent the tape from being ripped or stretched when pulled through the printer, such as 23 microns. It may be in a range of thicknesses, such as 9 to 30 microns or more, but preferably is 20-25 microns. Other materials may be used, such as polypropylene, if heat is not generated during the printing. In general, any polymer material can be used as long as it is thin and strong. By using polymer material, the necessary strength is provided without having additional thickness. Paper is not suitable because of its thickness, which causes the splice to have a much larger thickness than the web and leave an unprinted area. Since the polymer layer is thin, the top surface of the splice tape is only slightly higher than the top surface of the web.

The polymer layer 34 has applied thereto an imprintable layer 36 which causes a marking in the same manner as layer 14 of the web. The composition of the layer 36 should react to the same stimulus as the layer 14 of the web that it is being used. Since the composition is being applied to a polymer instead of paper, the exact formulation may be slightly different, but it should be similar so that the printed markings on the splice tape look similar to the markings printed on the webs.

The polymer layer 34 also has an adhesive layer 32 applied to a surface opposite the surface to which the imprintable layer 36 is applied. The adhesive layer 32 is used to hold the splice tape 30 onto the webs 10. The adhesive should be strong enough so that the webs will not be pulled from the splice tape during the printing process. Although not shown, a removable backing layer may cover the adhesive layer 32 until the splice tape is being used.

Figure 4:
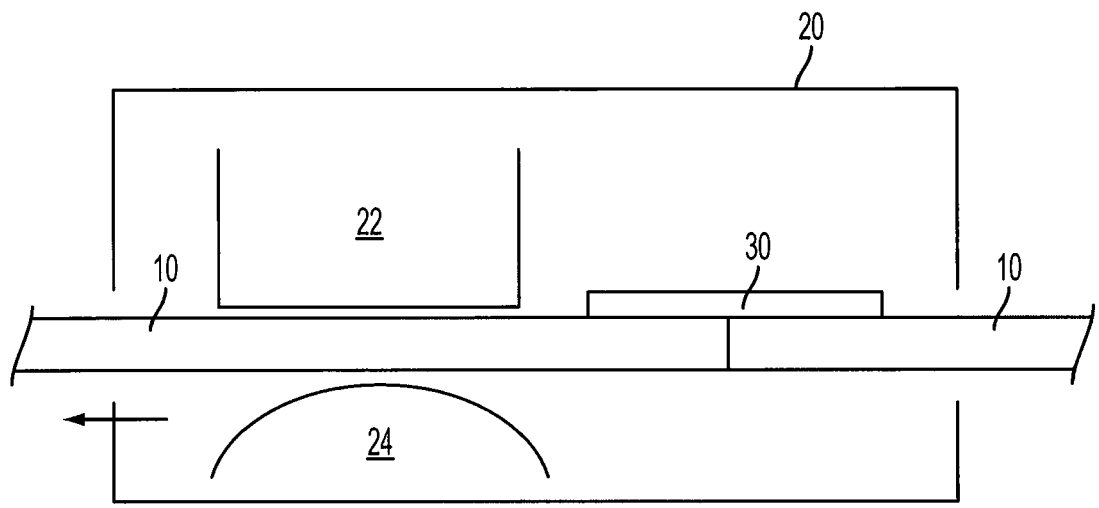
FIGS. 4 and 5 are diagrams of a print head while printing on a web with a splice.
Figure 5:
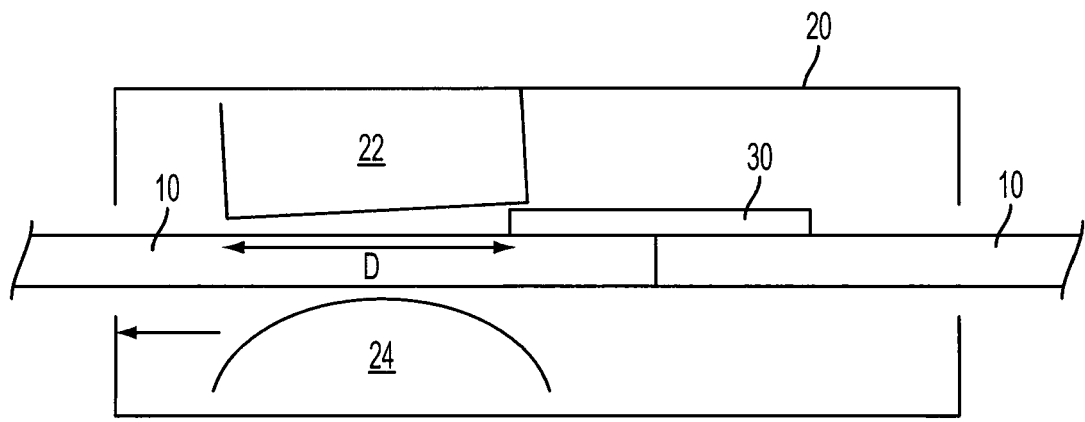

FIGS. 4 and 5 show a web with a splice as it proceeds through a printer 20. The printer includes a print head 22, which may be, for example, a thermal print head. The print head has a flat printing surface in contact with the top of the web, which carries the imprintable layer. This print head could have other shapes, such as round for a rotary printer or even be a ball point pen. A backing roller 24 may be present to hold the web against the print head. The backing roller could be a fixed flat plate in some cases, or might not even be present in some cases.

In FIG. 4, the web is moving to the left with the print head 22 making markings on the upper surface of the left hand web. The splice tape 30 has not yet reached the print head in this figure. In FIG. 5, the left edge of the splice tape 30 has encountered the right edge of the print head 22, causing the print head to be lifted up out of contact with the web. As the web continues to move left, the print head will continue out of contact with the web and will eventually lie completely on top of the splice tape. Once it is flat on the surface of the splice tape, it will print there. However, interference with printing is possible while the print head is sitting at an angle since there is less contact with either surface. As a result, for a distance D there could be no printing next to the splice tape. Likewise, there is a similar zone on the other side of the splice tape.

A white unprinted zone which can be seen on the final product is possible. However, if the thickness of the splice tape is small, the print head is lifted by a smaller amount and thus remains close to the web longer, allowing printing to continue longer so that the distance D of the unprinted area is minimized. Further, since the strength of the polymer tape allows the omission of a backing tape, the splice is considerably thinner than a paper tape with a backing layer. Likewise, if the print head is round, or if a ball point pen is used, it continues farther before contacting the splice tape.

When the splice tape is used for webs on which bar code labels are printed, for example, the unprinted area at the edge of the splice is so small that it is hardly noticeable on the label. The bars of the code on the splice are of the same or higher printed quality, because of the smooth surface of the film used for the splice tape and extend in alignment with those of the web. Only a thin white line that is hardly noticeable separates the bars on the label from the bars on the splice tape. This is an improvement over splice tapes which use paper tape which is thicker and which require a backing tape, causing a larger unprinted area.

In manufacturing, when the web 10 is coated with the imprintable layer, or if the web is being cut to a desired size, and a defect is spotted, the web is cut to remove the defect. The ends of the two parts are held next to each other and the splice tape 30 is placed over the gap. Alternatively, two short webs may be joined in the same manner. In the same manner, it is possible for the end user to perform splicing in case a defect is found after the web is sent from the manufacturer to the user. The ends of the web may be cut at 90° to the direction of the tape, with the splice tape being placed perpendicular to the web, or a smaller angle may be used for the cut and splice tape direction. If there is a backing layer on the splice tape, it is removed and the splice tape is applied to the two ends of the web with the adhesive side against the webs. This leaves the imprintable side up, so that patterns may be printed in the same manner as the on the web.

After the printing operation is completed, the web may be processed further to form desired products. This may involve no more than the cutting of the printed section as a label to be applied to a product. It is also possible for the webs 10 to have an adhesive layer formed on the back surface with or without a backing layer, so that printed labels can be easily applied to the product. It is also possible for the web to be die cut into labels before being wound onto a roll to simplify the final process after printing. When the web contains die cut labels, it is possible that a cut would be necessary in the area of a splice. In this case, the die cutting equipment will need to penetrate the web 10 and the splice 30. This cutting process would be significantly more difficult and prone to failures with a thick splice. The thinner splice of the present invention allows for more reliable die cutting while providing the benefits of the splice.

Numerous additional modifications and variations of the present invention are possible in light of the above teachings. It is therefore to be understood that within the scope of the appended claims, the invention may be practiced otherwise than as specifically described herein.

The invention claimed is:

1. A three layer splice tape splicing two ends of a two layer printable paper web on only one side, the splice tape comprising:
   a thin layer of polymer material, which is sufficiently strong to resist tearing and stretching during printing;
   a layer of adhesive applied to one surface of the polymer material; and
   a layer of printable thermally imaging composition applied to another surface of the polymer material opposite the adhesive layer;
   the printable paper web comprising:
   a paper layer; and
   a layer of printable thermally imaging composition applied to one side of the paper layer; wherein the adhesive layer of said splice tape is adhered to the thermally imaging composition layer of the paper web.

2. The splice tape according to claim 1, wherein the polymer material is polyester.

3. The splice tape according to claim 1, wherein the polymer material is polypropylene.

4. The splice tape according to claim 1, wherein the polymer material has a thickness of 9-30 microns.

5. The splice tape according to claim 1, wherein the polymer material has a thickness of 20-25 microns.

6. The splice tape according to claim 1, wherein the printable paper web has a similar printable thermally imaging composition as the splice tape, so that printed markings appear the same on the splice tape and on the paper web and without a gap due to the thinness of the splice tape.

7. The splice tape according to claim 1, wherein the splice tape is strong enough to splice the two ends of the printable paper web when applied to only one side.

8. A three layer splice arrangement for joining ends of two webs, each web being two layered and having a printable layer on a paper layer, comprising:

placing the ends of two webs adjacent each other; and extending a splice tape over only the printable layer on the ends to hold the webs together, the splice tape including a layer of polymer material, a layer of adhesive applied to one side of said polymer material and a layer of printable thermally imaging composition applied to another side of said polymer material opposite said adhesive layer; wherein the adhesive layer of said splice tape is adhered to the printable layer over on the paper layer.

9. The splice arrangement according to claim 8, wherein the polymer material is polyester.

10. The splice arrangement according to claim 8, wherein the polymer material is polypropylene.

11. The splice arrangement according to claim 8, wherein the polymer material has a thickness of 9-30 microns.

12. The splice arrangement according to claim 8, wherein the polymer material has a thickness of 20-25 microns.

13. The splice arrangement according to claim 8, wherein the printable layer of the web has a similar printable thermally imaging composition as the splice tape, so that printed markings appear the same on the splice and on the web and without a gap due to the thinness of the splice tape.

14. The splice arrangement according to claim 8, wherein the polymer material is sufficiently strong to resist tearing and stretching during printing.

15. The splice arrangement according to claim 8, wherein the webs are pre-cut label stock.

16. The splice arrangement according to claim 8, wherein the webs are thermal imaging stock.

17. The splice arrangement according to claim 8, wherein the webs are carbonless stock.

\* \* \* \* \*